United States Patent [19]
Brown

[11] Patent Number: 5,803,024
[45] Date of Patent: Sep. 8, 1998

[54] COOLANT FILTER HAVING A DELAYED RELEASE SUPPLEMENTAL COOLANT ADDITIVE CARTRIDGE

[75] Inventor: Gene W. Brown, Kearney, Nebr.

[73] Assignee: Baldwin Filters, Inc., Kearney, Nebr.

[21] Appl. No.: 896,903

[22] Filed: Jul. 18, 1997

[51] Int. Cl.⁶ .............................. F01P 3/12; B01D 27/00
[52] U.S. Cl. ...................... 123/41.15; 210/192; 210/440; 123/198 E
[58] Field of Search ................... 123/41.15; 210/440, 210/443, 444, 506, 192, 205, 206, 209; 422/261, 263, 264, 274, 277, 278, 283; 165/119, 134.1

[56] References Cited

U.S. PATENT DOCUMENTS

| | | | |
|---|---|---|---|
| 2,995,253 | 8/1961 | Belgarde et al. | 210/323.2 |
| 4,782,891 | 11/1988 | Cheaolle et al. | 165/134.1 |
| 5,024,268 | 6/1991 | Cheadle et al. | 165/134.1 |
| 5,050,549 | 9/1991 | Sturmon | 123/198 E |
| 5,094,745 | 3/1992 | Reynolds | 210/206 |
| 5,350,506 | 9/1994 | Dombek et al. | 210/136 |
| 5,435,346 | 7/1995 | Tregidgo et al. | 137/564.5 |
| 5,662,799 | 9/1997 | Hudgens et al. | 210/192 |
| 5,690,814 | 11/1997 | Holt | 210/94 |
| 5,741,433 | 4/1998 | Mitchell et al. | 252/74 |

*Primary Examiner*—Henry Yuen
*Assistant Examiner*—Hai Huynh
*Attorney, Agent, or Firm*—Leydig, Voit & Mayer, Ltd.

[57] ABSTRACT

A coolant filter for a diesel engine having a mechanism for delayed release of chemical additives into the coolant being filtered. The present invention provides a spin-on canister type coolant filter which combines the functions of filtering the coolant of the diesel engine cooling system with the function of adding supplemental coolant additives to the coolant to reduce or eliminate the effects of cavitation erosion caused by vibration of the cylinder liners of the diesel engine. The filter includes a chemical additive cartridge mounted within an outer shell and a filter cartridge mounted about the chemical additive cartridge and inside the outer shell. Coolant to be filtered passes by the chemical additive cartridge, which slowly releases the chemical additive into the passing coolant stream. The coolant containing the chemical additive then passes through the filter to remove relatively large pieces of the chemical additive as well as other debris before exiting the filter for subsequent cooling of the diesel engine. In order to slowly release the chemical additive, the chemical cartridge includes relatively small air vents and outlets and the filter outlet includes a restriction orifice which further slows the release of the chemical additive into the coolant stream.

9 Claims, 6 Drawing Sheets

COOLANT FILTER HAVING A DELAYED RELEASE SUPPLEMENTAL COOLANT ADDITIVE CARTRIDGE

FIELD OF THE INVENTION

The present invention is generally related to filters, and more particularly is related to coolant filters for diesel engines adapted to release chemical additives into the coolant being filtered.

BACKGROUND OF THE INVENTION

A diesel engine, similar to many other types of engines, is primarily cooled through a liquid coolant system wherein water, or anti-freeze, or a mixture thereof passes between a radiator and various components of the engine needing heat dissipation. A plurality of coolant conduits and a coolant pump are provided to communicate the coolant and power the system, respectively. One area of a diesel engine directly cooled by such a coolant system is the engine block. Specifically, the actual cylinders within the engine block are subjected to extreme temperatures during the combustion of the diesel fuel and need constant cooling.

Modern heavy duty diesel engines used in large trucks and off highway equipment typically include cylinder liners which occupy the inside of the cylinders, and are made of replaceable cast iron to facilitate easy replacement and rebuilding of the diesel engine, as opposed to light duty engines which require the entire cylinder head to be replaced. The coolant can be directed from the pump to the outside surface of the cylinder liner to dissipate heat. Seals are provided at the top and bottom of the cylinder liner to prevent leakage of coolant into the cylinders.

One problem associated with cylinder liners, is that they vibrate as the engine operates. Specifically, the reciprocating motion of the pistons and the pressure of combustion causes the liners to move back and forth within the cylinders. As this vibration continues over time, vapor bubbles are formed in the coolant due to the liner movement away from the coolant. When the piston reverses direction, the liner moves against the coolant and causes the vapor bubbles to implode. This constant scouring action eventually erodes the liner and can potentially allow coolant to enter the cylinder and engine lubrication system. This phenomenon is known as cavitation erosion or liner pitting. In certain instances, such cavitation erosion can occur in as few as 250 hours or 12,000 miles of operation for the diesel engine. This consequently results in an extreme expense to the operator of the engine.

With typical diesel engines, the water or anti-freeze is periodically filtered to prevent contaminants from reaching and potentially damaging the various moving components of the diesel engine. More recently, diesel engines have been designed to include supplemental coolant additives which are added to the water or the anti-freeze to perform additional functions within the engine such as minimizing cavitation erosion and corrosion Systems have therefore been designed which release a chemical additive into the water or anti-freeze which counteracts the effects of such vibration and dramatically reduces the occurence of cavitation erosion. Such supplemental coolant additives, or SCAs normally include a chemical combination including nitrites such as borate and nitrite, or molybdate, phosphate and nitrite, which chemically react with the water or anti-freeze (ethylene or propylene glycol) to produce a coating on the outside of the cylinder liners which discourages cavitation erosion.

Since a relatively small amount of SCA is required within the coolant, systems have been devised to slowly release the chemical additive into the water or coolant stream over time to elongate the productive life of the SCA supply. Normally, the SCA chemicals are added to the water in conjunction with a coolant filter provided adjacent the water pump of the diesel engine.

However, as diesel engine manufacturers are requiring longer and longer intervals between the changing of filters, current SCA release mechanisms do not provide a sufficiently long life to allow the changing of the coolant filter to correspond with the changing of the fuel and oil filters of the diesel engine. Moreover, current systems often allow for an inaccurately regulated amount of SCA to be released into the coolant stream, or allow relatively large particles of SCA to be released therein and thereby potentially damage the diesel engine. Furthermore, current methods of manufacturing coolant filters and systems for releasing chemical additives into the coolant stream have resulted in fairly cost prohibitive systems in that complicated devices are provided to allow for the delayed release of the chemical additives into the coolant stream, while at the same time providing the mechanism by which the coolant stream can be filtered.

SUMMARY OF THE INVENTION

It is therefore a primary aim of the present invention to provide a coolant filter for a diesel engine which provides a delayed release of supplemental coolant additives into the coolant stream.

It is an objective of the present invention to provide a coolant filter which not only provides a delayed release for chemical additives into the coolant stream to reduce the effects of cavitation erosion, but which also filters the coolant after the chemicals have been added thereto to prevent detrimentally large particulates and pellet coatings from coming into contact with the moving parts of the diesel engine.

It is another objective of the present invention to provide a delayed release chemical coolant filter which reliably releases the chemical additives into the coolant stream without slowing or completely stopping the flow of the chemical additives or the coolant as by clogging.

It is another objective of the present invention to provide a delayed release chemical coolant filter which includes sufficient filtering media and chemical additives to substantially increase the life of the filter and the interval at which the filter needs to be replaced.

It is a further objective of the present invention to minimize the flow of coolant past the supplemental coolant additive chemicals in order to slow the dissolution of the supplemental coolant additive pellets contained within the filter.

It is still another objective of the present invention to provide a method by which a delayed release chemical coolant filter can be quickly and economically manufactured.

In accordance with these aims and objectives, it is a feature of the present invention to provide a filter having a chemical additive cartridge past which the water or coolant flows to have the chemical additives released therein. Little or no pressure differential is created across the supplemental coolant additive pellets to thereby slow the dissolution of the additive pellets and allow the SCA to slowly flow into the coolant stream.

It is another feature of the present invention to provide a filtering media downstream of the point at which the chemical additives are added to the coolant to thereby filter and remove relatively large particulates of the chemical additive to thereby prevent them from clogging the system or coming into contact with moving elements of the diesel engine.

It is another feature of the present invention to provide a delayed release chemical coolant filter wherein the cartridge within which the chemical additive is stored includes an air vent and an outlet having adjustable diameters, and wherein the outlet to the filter includes a restriction orifice to thereby regulate the rate at which the chemical additive is released into the water or coolant.

It is still another feature of the present invention to provide the delayed release chemical coolant filter in the form of a spin-on canister to allow for easy and quick replacement of the filter.

It is still another feature of the present invention to provide a method by which a delayed release chemical coolant filter can be manufactured comprising the steps of placing a baseplate including an inlet and outlet on the work surface, placing a chemical cartridge on the baseplate, positioning a prefabricated filter around the chemical cartridge, depositing supplemental coolant additives into the chemical cartridge, closing the chemical cartridge, placing the spring on the closed chemical cartridge, and fitting and attaching an outer shell around the cartridge filter to form a completed filter.

In one embodiment of the present invention a coolant filter for a diesel engine is provided of the type wherein chemical additives are adapted to be added to the coolant to be filtered to minimize cavitation erosion. The filter includes an outer housing defining a filter chamber. The outer housing is substantially cylindrical with a closed end and an open end closed by a baseplate, and the baseplate includes concentric inlets and outlets. The filter further includes a chemical additive cartridge mounted within the outer shell. In the preferred embodiment the cartridge includes a substantially cylindrical tube having an open end and a closed end, an enlarged diameter bowl attached to the tube open end and an end cap closing the open end of the bowl. The preferred embodiment therefore is adapted to house a greater quantity of coolant additive than the alternative embodiments. The cartridge is filled with supplemental coolant additives to be released into the coolant being filtered. In the preferred embodiment the cartridge includes an air vent and a pair of outlet orifices to allow the additive to be released, while the cartridge tube closed and includes a restriction orifice isolated from the coolant additive. The filter further includes a filter cartridge mounted around the chemical additive cartridge and inside the outer housing, with the filter cartridge being downstream of the chemical additive cartridge. Coolant to be filtered therefore enters the filter through the baseplate and passes by the chemical additive cartridge outlets such that the chemical additive is thereby added to the coolant. The coolant containing the additives then passes through the filter cartridge and exits through the restriction orifice and baseplate outlet.

These and other aims, objectives, and features of the present invention will become more apparent from the following detailed description when taken in conjunction with the accompanying drawings.

While the present invention is susceptible of various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions and equivalents falling within the spirit and scope of the present invention as defined by the appended claims.

DETAILED DESCRIPTION OF THE PREFERRED EMBODIMENT

Figure 1:
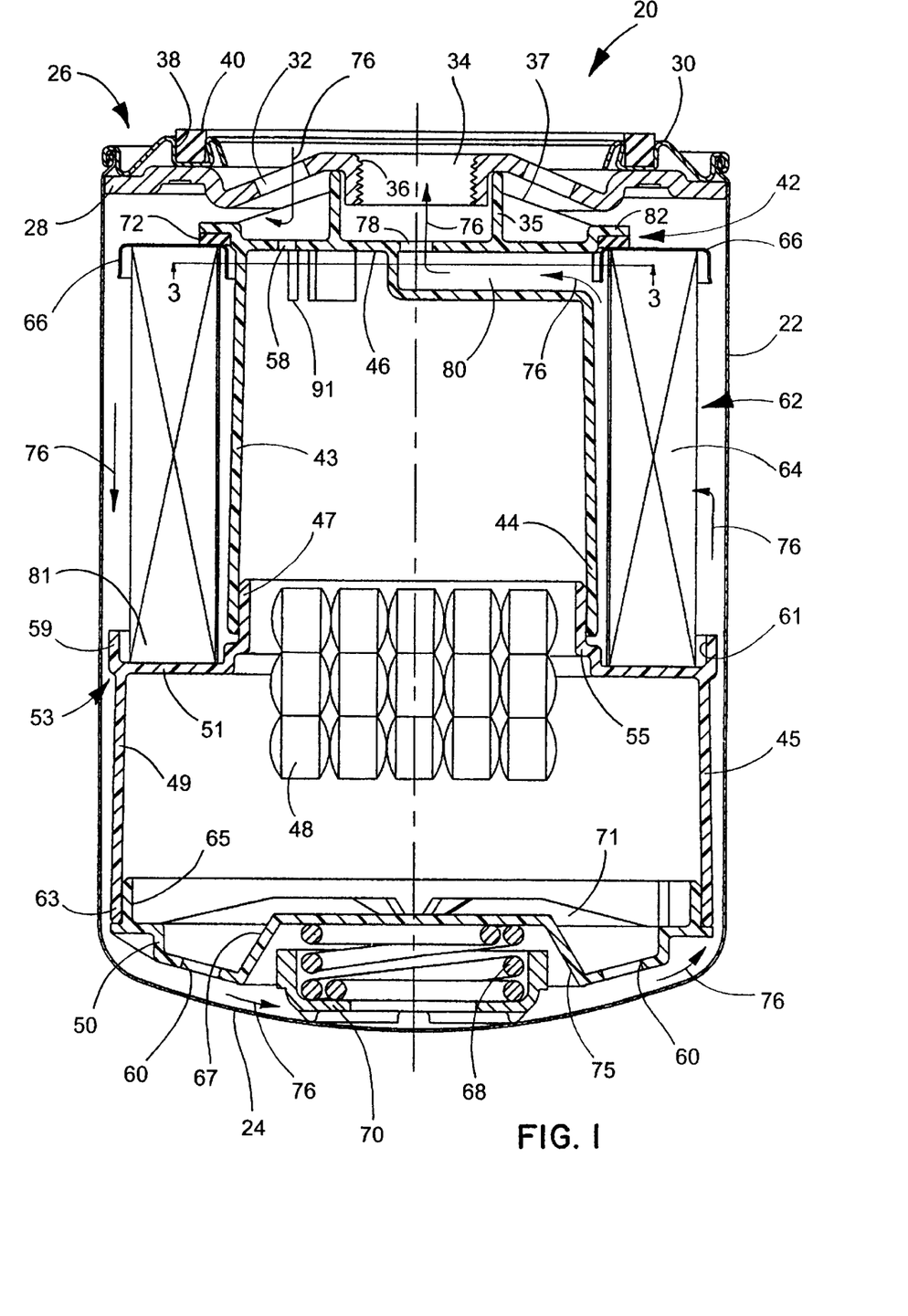
FIG. 1 is a sectional view of the preferred embodiment of the present invention.

Referring now to the drawings, and with specific reference to FIG. 1, a preferred embodiment of the present invention is shown and is generally designated as filter 20. As shown therein, filter 20 has the appearance of a conventional spin-on filter to facilitate easy replacement of the filter at timed intervals during the operation of a diesel engine. However, as indicated above, the present invention greatly improves upon the prior art by providing an internal mechanism by which a relatively large quantity of supplemental coolant additive can be slowly released into the passing coolant stream and filtered before entering the diesel engine. The patentable features of the present invention are therefore directed to the structure of the filter, as well as the method by which the filter is constructed, but not the actual chemical composition of the supplemental coolant additive.

In accordance with these features, it can be seen that filter 20 includes outer shell 22 having a substantially cylindrical outer shape with closed end 24 and open end 26. As also shown therein, open end 26 is closed by baseplate 28 having seaming lid 30 welded thereto. Baseplate 28 includes outer circumferentially disposed inlets 32 as well as cylindrical inner outlet 34, the importance and function of which will be described with further detail herein. However, from preliminary inspection of baseplate 28, it can be seen that outlet 34 includes internal threads 36 which facilitate easy and quick attachment and replacement of water filter 20 to and from a conventional diesel engine. It can also be seen that seaming lid 30 is provided to allow for easy attachment of outer shell 22 to baseplate 28 to thereby provide a completed filter 20. Seaming lid 30 also includes annular groove 38 sized to receive gasket 40. Gasket 40 is adapted to compress against the side of a diesel engine when filter 20 is attached thereto.

Figure 6:
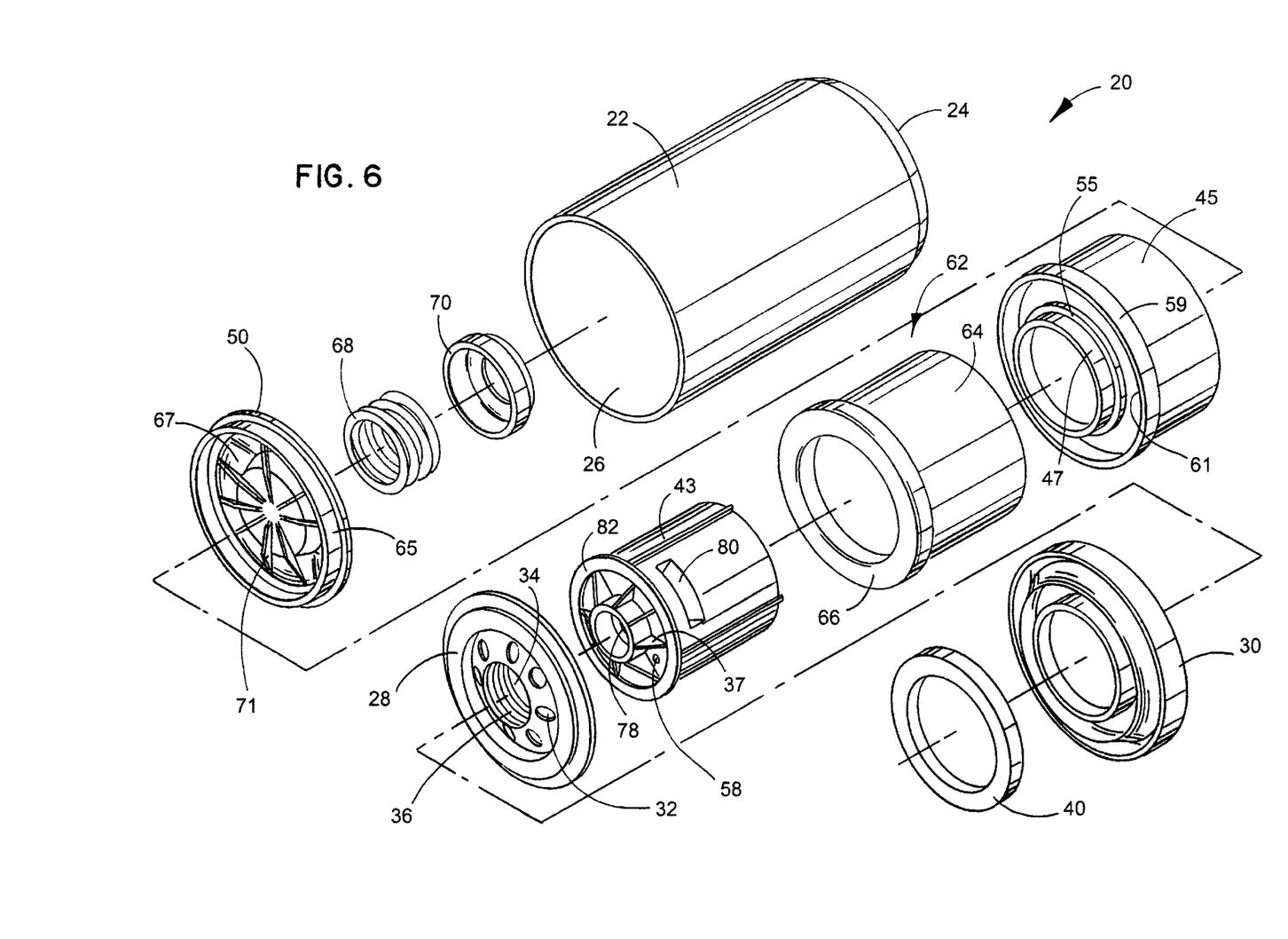
FIG. 6 is an exploded view of the embodiment shown in FIG. 1.

Turning now with specific reference to the construction of the preferred embodiment of chemical cartridge 42, it can be seen from FIGS. 1 and 6 that chemical cartridge 42 includes substantially cylindrical tube 43, substantially cylindrical and enlarged diameter bowl 45 and end cap 50. Cylindrical tube 43 includes open end 44 and closed end 46 and is adapted to be filled with a predetermined amount of supplemental coolant additive pellets 48, as will be described in further detail herein. Closed end 46 includes reduced diameter ring 35 and a plurality of support ribs 37. It is to be understood that any conventional supplemental coolant pellet 48 can be included with the present invention including those identified in the background of the invention, and that the construction and chemical composition are not the subject of the present invention. However, for the sake of clarity and completeness, it is important to note that in the preferred embodiment, supplemental coolant additive pellet 48 include a hardened outer shell which slowly dissolves to prolong the useful life of the coolant.

Bowl 45 is attached to open end 44 of cylindrical tube 43 by way of annular rim 47. Bowl 45 includes outer diameter cylindrical wall 49 having orthogonally disposed ledge 51 provided at end 53. Annular rim 47 is integral with ledge 51 and in the preferred embodiment is manufactured from injection molded plastic. As can be readily appreciated from FIG. 1, bowl 45 extends closer to shell 22 than does tube 43 and thereby is able to house an increased amount of coolant additive.

Figures 7, 8:
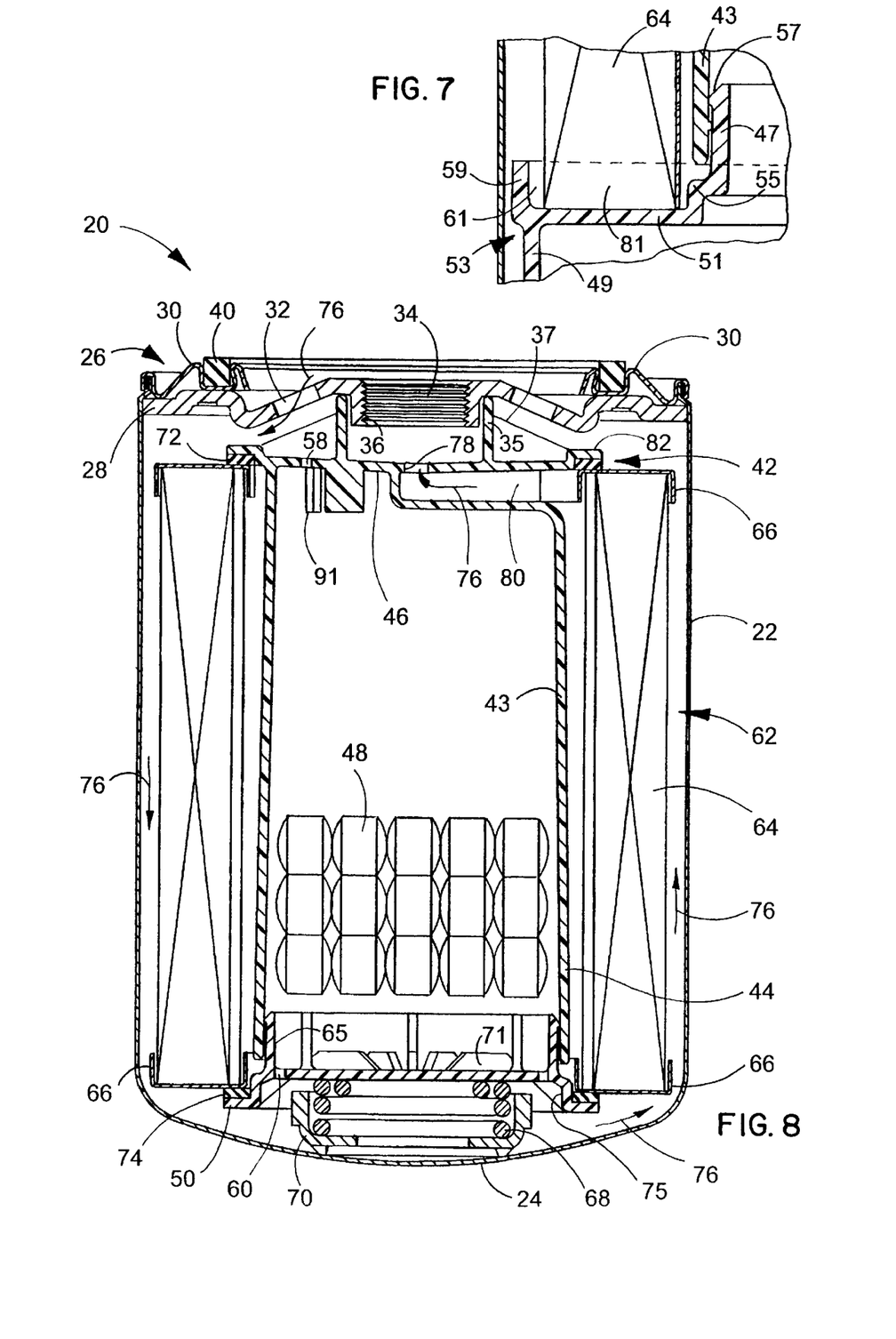
FIG. 7 is an enlarged fragmentary sectional view of the juncture between the cartridge tube and cartridge bowl.
FIG. 8 is a sectional view of an alternative embodiment of the present invention.

Referring now to FIG. 7, it can be seen that a step 55 is provided between rim 47 and ledge 51 to provide a positive stop to cylindrical tube 43 as rim 47 slides into tube 43. To provide an effective seal between rim 47 and tube 43, radial seal 57 is provided on arms 47 to slide along the inner surface of cylindrical tube 43 when filter 20 is assembled. On the outer circumference of ledge 51, annular lip 59 is provided to form a recess 61 into which filter cartridge 62 fits as will be described with further detail herein.

Figure 4:
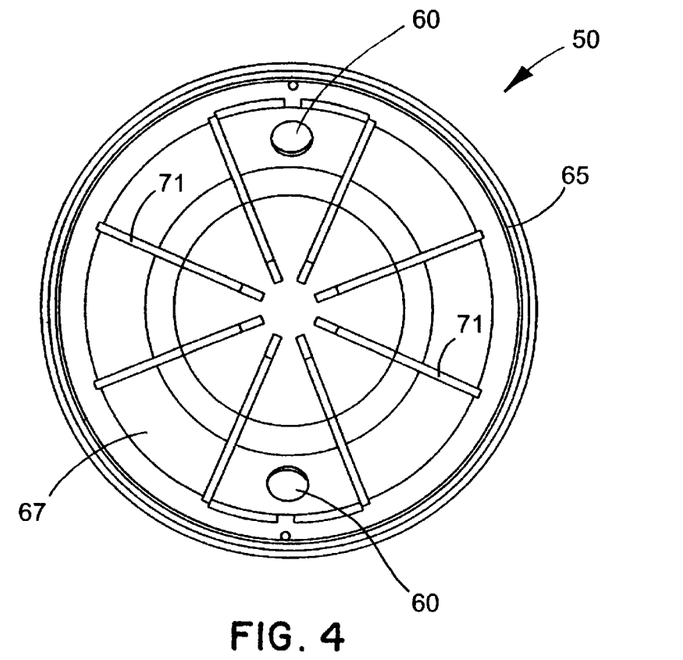
FIG. 4 is a top plan view of the cartridge end plate of the preferred embodiment.
Figure 5:
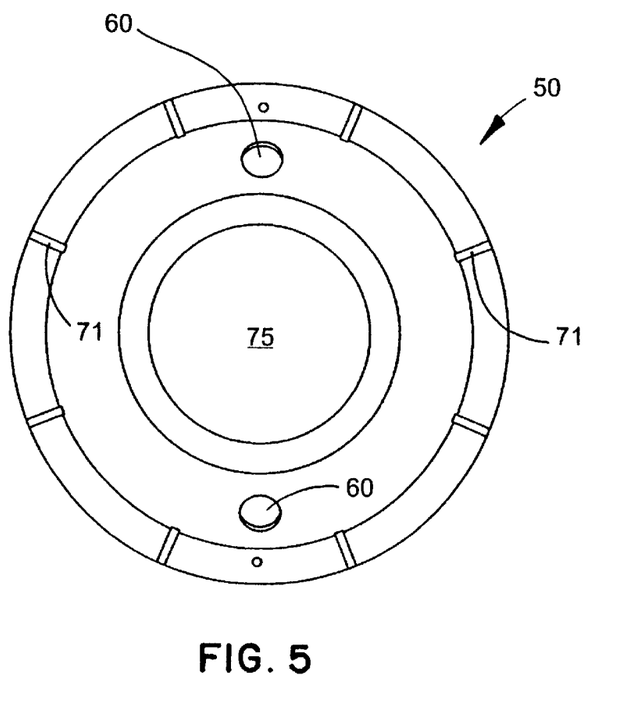
FIG. 5 is a bottom plan view of the cartridge end plate of the preferred embodiment.

Open end 63 of bowl 45 is closed with end cap 50 once the entire chemical cartridge 42 is filled with supplemental coolant additive pellets 48. As shown in FIGS. 1, 4, and 5, end plate 50 has an overall disk like appearance, and similar to bowl 45 includes annular rim 65 which is adapted to slide into open end 63 of bowl 45. To provide a seal therebetween, rim 65 includes a radial seal similar to the radial seal provided on rim 47 of bowl 45. At this point, it is important to reiterate that cartridge 42 is designed in the preferred embodiment to provide an enlarged space to house supplemental coolant additive pellets 48. Toward that end, end cap 50 is provided with annular groove 67 adapted to extend toward closed end 24 of outer shell 22 when filter 20 is assembled. In this manner, the space adapted to receive supplemental coolant additive pellets 48 is expanded. In order to expand the rigidity and strength of end plate 50, a plurality of radially disposed ribs 71 are included with end plate 50 as best shown in FIG. 4. It can also be seen from FIG. 1 that end plate 50 includes centralized recess 75 which is adapted to receive spring 68 when filter 20 is ultimately assembled.

In order to provide for the release of supplemental coolant additive pellets 48 into the passing fluid stream, chemical cartridge 42 includes, in the preferred embodiment, air vent 58 and a pair of supplemental coolant additive outlets 60. As shown in FIG. 1, air vent 58 is provided in the closed end of cylindrical tube 43 while outlets 60 are provided in diametric opposition in groove 67 of end plate 50 (see FIGS. 4 and 5). It can be appreciated that the relative size of air vent 58 and supplemental coolant additive 60 can be varied at initial manufacture to adjust the release rate of the supplemental coolant additive. However, it is intended that the sizes of air vent 58 and supplemental coolant additive outlets 60 are purposely kept small to minimize the rate at which the supplemental coolant additives are released into the passing coolant stream. It is important to note that in alternative embodiments, air vent 58 and supplemental coolant additive outlets 60 can be provided with means by which their respective sizes can be adjusted to vary and regulate the rate in which the additive is released into the passing coolant stream. Moreover, a plurality of deflection ribs 91 are provided about air vent 58 and supplemental coolant additive outlets 60 to prevent the supplemental coolant additive from clogging air vent 58 or outlets 60, especially when filter 20 is at an elevated temperature.

Referring again to FIG. 1, it can be seen that filter cartridge 62 is provided about chemical coolant cartridge 42 and within outer shell 22. Specifically, filter cartridge 62 is provided about cylindrical tube 43 of chemical cartridge 42. As is conventional, filter cartridge 62 includes pleated paper filter media 64 and metal end cap 66. Filter cartridge 62 therefore can be prefabricated before the actual assembly of filter 20 to provide a more efficient and cost effective assembly process. End 81 of filter cartridge 62 is not provided with metal end cap 66 as it is adapted to fit into recess 61 provided on bowl 45.

As also shown in FIG. 1, chemical cartridge 42 and filter cartridge 62 are spring loaded into filter 20 by a spring 68 which is positioned adjacent end cap 50 and closed end 24 of outer shell 20. Axial seal or gasket 72 is provided between chemical cartridge 42 and filter cartridge 62 to separate the unfiltered coolant from the filtered coolant.

It can therefore be seen that the flow path of the coolant, designated by arrow 76, though filter 20 begins with coolant to be filtered flowing from a pump (not shown) of a diesel engine and into filter 20 through inlet 32. The in-flowing coolant is normally under moderate pressure, typically in the neighborhood of 15 psi, the radiator cap pressure. The in-flowing coolant then flows past chemical cartridge outlets 60 which cooperate with air vent 58 to allow relatively small amounts of the supplemental coolant additive to be released therein. The water containing the released supplemental coolant additive then flows through pleated filter media 64 of filter cartridge 62 to remove relatively large particulates of the supplemental coolant additive as well as other debris in order to protect the moving elements of the diesel engine. After flowing radially inward through filter cartridge 62, the coolant continues along flow path 76, and exits filter 20 through outlet 34. Outlet 34 is connected to the inlet of the engine water pump which is typically at a pressure of around 13 psi.

Figure 2:
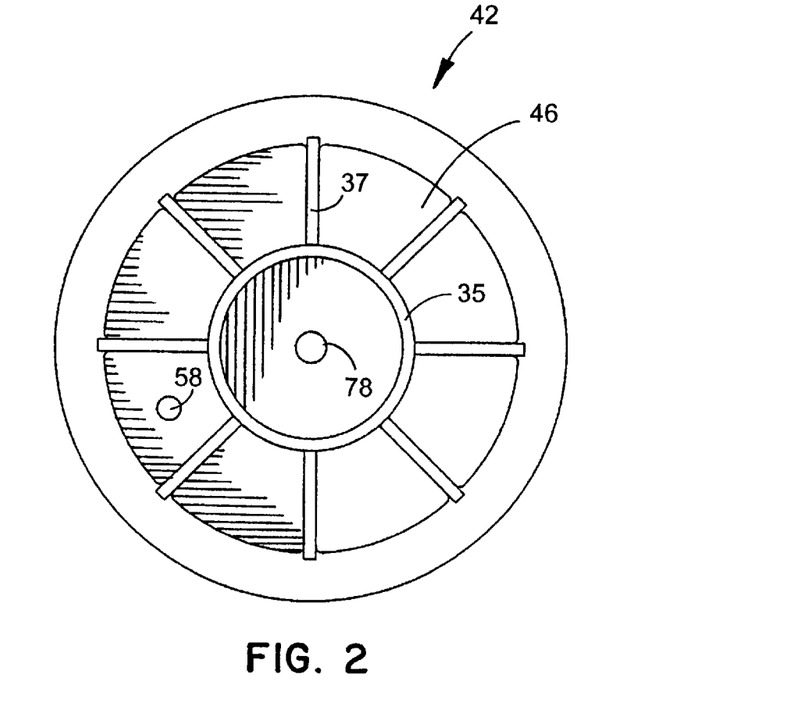
FIG. 2 is a top plan view of the chemical additive cartridge.
Figure 3:
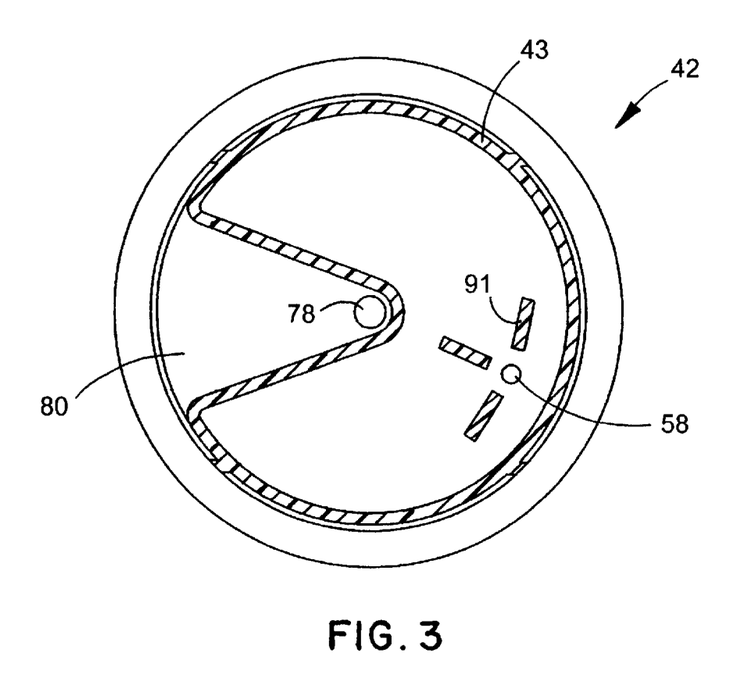
FIG. 3 is a sectional view of the chemical additive cartridge taken along line 3—3 of FIG. 1.

However, before exiting filter 20, it can be seen in FIGS. 1–3 that the filtered coolant must pass through restriction orifice 78. Restriction orifice 78 works in conjunction with exit plenum 80 to meter and regulate the amount of coolant which can exit filter 20. It is to be understood that the actual size of restriction orifice 78 can be varied depending on the particular application, but that restriction orifice 78 is provided to work in conjunction with the relatively slow release rate provided through supplemental coolant additive outlet 60 to limit the amount of additive added to the coolant and thereby extend the life of filter 20.

As stated above, the inventive features of the present invention are not only directed to the actual components of the filter 20, but also to the method by which filter 20 is assembled. By providing a streamlined process by which filter 20 can be assembled, including the prefabrication of certain components, filter 20 can be manufactured not only quickly, but cost effectively as well. In order to clearly describe the method by which filter 20 is assembled, FIG. 6 is provided. As shown therein, baseplate 28 having seaming lid 30 already welded thereto can be provided as one partially prefabricated component which can then be provided on a work surface (not shown). Baseplate 28 and seaming lid 30 would be positioned on the work surface such that the seaming lid 30 is provided downward. Plastic chemical cartridge tube 43 would then be provided on top of baseplate 28, with axial gasket 72 then being provided on flange 82 of chemical cartridge tube 43. Prefabricated filter cartridge 62 would then be provided around the cylindrical tube 43 of chemical cartridge 42 such that bottom metal end cap 66 engages axial seal 72.

Bowl 45 can then be connected to tube 43 such that rim 47 engages the inner surface of tube 43. Chemical cartridge 42 would then be filled with a predetermined amount of supplemental coolant additive pellets 48. End cap 50 would then be positioned into the open end of chemical cartridge bowl 45 and through the interaction of its rim 65 and radial seal would close and substantially seal open end 63 of chemical cartridge bowl 45. Spring 68 and protective cover 70 would then be provided on top of end cap 50, and outer shell 22 would be fit down over chemical cartridge 42, filter cartridge 62, and spring 68 until open end 26 of outer shell 22 comes into contact with seaming lid 30. In order to reach this point, closed end 24 will engage spring 68 and compress spring 68 to thereby bias the components of filter 20 into tight interior engagement. The biasing motion will be facilitated by the sliding action between bowl 45 and tube 43 as best shown in FIG. 7. A variety of means can then be provided to actually attach outer shell 22 to seaming lid 30, including welding, with a relatively simple rolling or double seaming process being used in the preferred embodiment.

Figure 9:
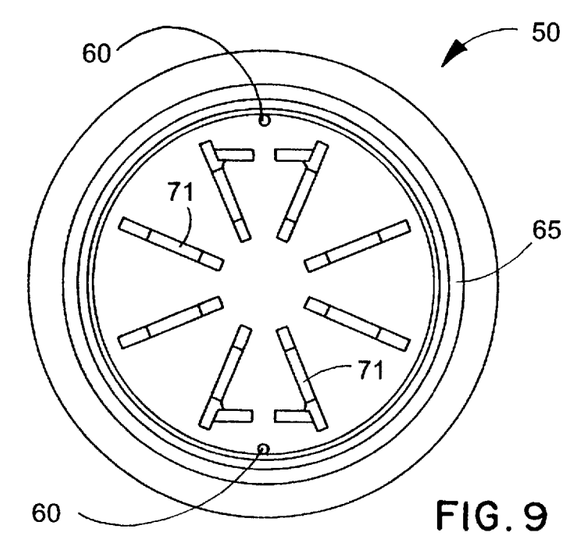
FIG. 9 is a top plan view of the alternative embodiment of the chemical additive cartridge end plate.
Figure 10:
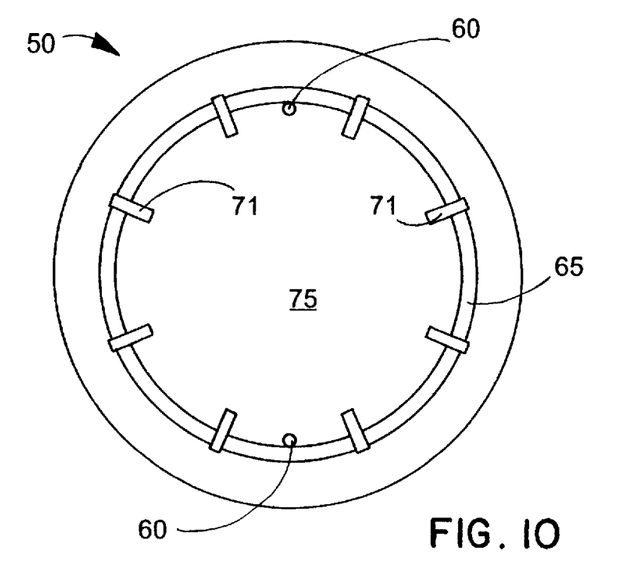
FIG. 10 is a bottom plan view of the alternative embodiment of the chemical additive cartridge end plate.

An alternative embodiment of the present invention is shown in particularity in FIGS. 8 through 10, with the predominant difference between the alternative embodiment and the preferred embodiment being the overall volume of supplemental coolant pellets 48 which can be held by filter 20. For the sake of clarity, the reference numerals used to described the alternative embodiment are identical to those used to describe the preferred embodiment except when new or different elements are provided. With that being said, it can be seen that as opposed to the preferred embodiment, the alternative embodiment does not employ the use of a bowl 45, rather tube 43 extends the length of filter 20 and is connected directly to end cap 50. This allows filter cartridge 62 to also extend the length of filter 20. Since filter cartridge 62 does not meet against a ledge 51 of bowl 45 as with the preferred embodiment, a second metal end cap 66 is provided along with a second axial seal 74 to separate the filtered coolant from the unfiltered coolant.

Whereas the preferred embodiment provides a greater volume of supplemental coolant additive pellets 48 and thereby is able to provide a longer life span for the usable supplemental coolant additive, the alternative embodiment includes a longer filter medium 64 which in turn provides a longer life to the filter cartridge 62. Depending on the particular application of filter 20, either the preferred embodiment or the alternative embodiment, or some other variation thereon, can be used to most specifically tailor the cartridge to the given application.

From the foregoing, it can be seen that the present invention brings to the art a new and improved coolant filter for a diesel engine which includes a mechanism by which supplemental coolant additives can be released into the filtered coolant on a delayed basis. The life of the filter can thereby be substantially extended to correspond to the current industry demands for longer filter life. In addition, the present invention provides a filter downstream of the point at which the chemical additives are released into the coolant stream to thereby provide a means by which relatively large and potentially damaging coolant additive particulates and other debris can be filtered out of the coolant stream before again entering into the diesel engine. Moreover, by providing a method by which the filter can be fabricated quickly, and with a provision of a number of prefabricated components, the resulting filter can not only be fabricated more quickly, but at lower cost as well. Furthermore, through the provisions of multiple embodiments employing differently shaped and dimensional chemical additive cartridges, the volume of the chemical additive supply can be adjusted

What is claimed is:

1. A coolant filter for a diesel engine, the coolant filter adapted to add a chemical additive to the coolant to minimize the cavitation erosion effects of coolant passing by vibrating cylinder liners of the diesel engine, the filter comprising:

an outer housing defining a filter chamber, the outer housing being substantially cylindrical with a closed end and an open end closed by a baseplate, the baseplate including concentric inlets and outlets;

a chemical additive cartridge mounted within the outer shell, the cartridge being substantially cylindrical with an open end and a closed end, the open end being closed with an end cap, the cartridge being filled with a supplemental coolant additive to be released into the coolant being filtered, the cartridge including an air vent and an outlet orifice to allow the additive to be released, the cartridge including a restriction orifice isolated from the coolant additive; and a filter cartridge mounted around the chemical additive cartridge and inside the outer housing, the filter cartridge being downstream of the chemical additive cartridge, coolant to be filtered entering the filter through the baseplate inlet and passing by the chemical additive cartridge outlet, the chemical additive thereby being added to the coolant, the coolant containing the additive then passing through the filter cartridge and exiting through the restriction orifice and baseplate outlet.

2. The filter of claim 1 wherein the supplemental coolant additive includes a plurality of coated pellets containing nitrites.

3. The filter of claim 1 wherein the supplemental coolant additive includes chemicals adapted to aid in the prevention of cavitation erosion or corrosion.

4. The filter of claim 1 wherein the end cap includes the chemical cartridge outlet and the chemical cartridge closed end includes the air vent.

5. The filter of claim 1 wherein the chemical cartridge air vent and outlet have variable diameters to thereby adjust the rate at which the supplemental coolant additive is released into the coolant to be filtered.

6. The filter of claim 4 wherein a plurality of ribs are provided adjacent the cartridge air vent and the outlet orifice to prevent clogging of the air vent and outlet orifice with the supplemental coolant additive.

7. The filter of claim 1 wherein the baseplate outlet includes internal threads adapted to rotatably attach the filter to the diesel engine.

8. The filter of claim 1 wherein the chemical additive cartridge is comprised of a cylindrical tube section, an enlarged diameter bowl section, and an end plate.

9. The filter of claim 8 wherein the enlarged diameter bowl includes an annular rim adapted to slide with an interference fit within an inner surface of the cylindrical tube and the end cap includes an annular rim adapted to slide with an interference fit within an inner surface of the enlarged diameter bowl to establish relatively leak-tight seals therebetween.

* * * * *